United States Patent [19]
Ettenhofer et al.

[11] 3,979,712
[45] Sept. 7, 1976

[54] SENSOR ARRAY ACOUSTIC DETECTION SYSTEM

[75] Inventors: Kurt L. Ettenhofer, Swarthmore; Richard L. Thomas, Furlong; John L. Harris, Ivyland, all of Pa.

[73] Assignee: The United States of America as represented by the Secretary of the Navy, Washington, D.C.

[22] Filed: Nov. 5, 1971

[21] Appl. No.: 197,185

[52] U.S. Cl. ............................... 340/6 R; 340/16 P
[51] Int. Cl.² ............................................ G01S 3/80
[58] Field of Search ................ 340/6 R, 16 R, 16 P

[56] References Cited
UNITED STATES PATENTS
3,296,581  1/1967  Warner .............................. 340/6 R

OTHER PUBLICATIONS

Moore, "Digital Phase Angle Meter Control," p. 35, IBM Tech. Disclosure Bulletin, vol. 3, No. 2, July 1960.

Primary Examiner—Richard A. Farley
Attorney, Agent, or Firm—R. S. Sciascia; Henry Hansen

[57] ABSTRACT

An acoustic detection system comprising two arrays of omnidirectional sensors or hydrophones wherein the sensors in each array are disposed along a curved line, such as an arc of a cylindrical surface. Accordingly an acoustic signal or wavefront propagating along any vector within the arc is registered by the respective sensors as phase lags determined by the locations thereof. The respective sensor output signals are each connected to a preselected electrical delay circuit such that the registered phase lags are further increased. The delayed sensor signals are then summed for each array, forming two directional beams and the signal sum for each array is then connected to identical narrow bandpass filters. The output of each filter is fed to a hard limiter, then to a differentiator and the output signals of the differentiators control a bistable flip-flop producing a pulse train where the width of each pulse corresponds to the phase lag difference between the beam signals. The pulse widths are then sorted into discrete bins of phase in a coincidence processor and read out when any one bin registers a number of pulses exceeding a predetermined number.

5 Claims, 4 Drawing Figures

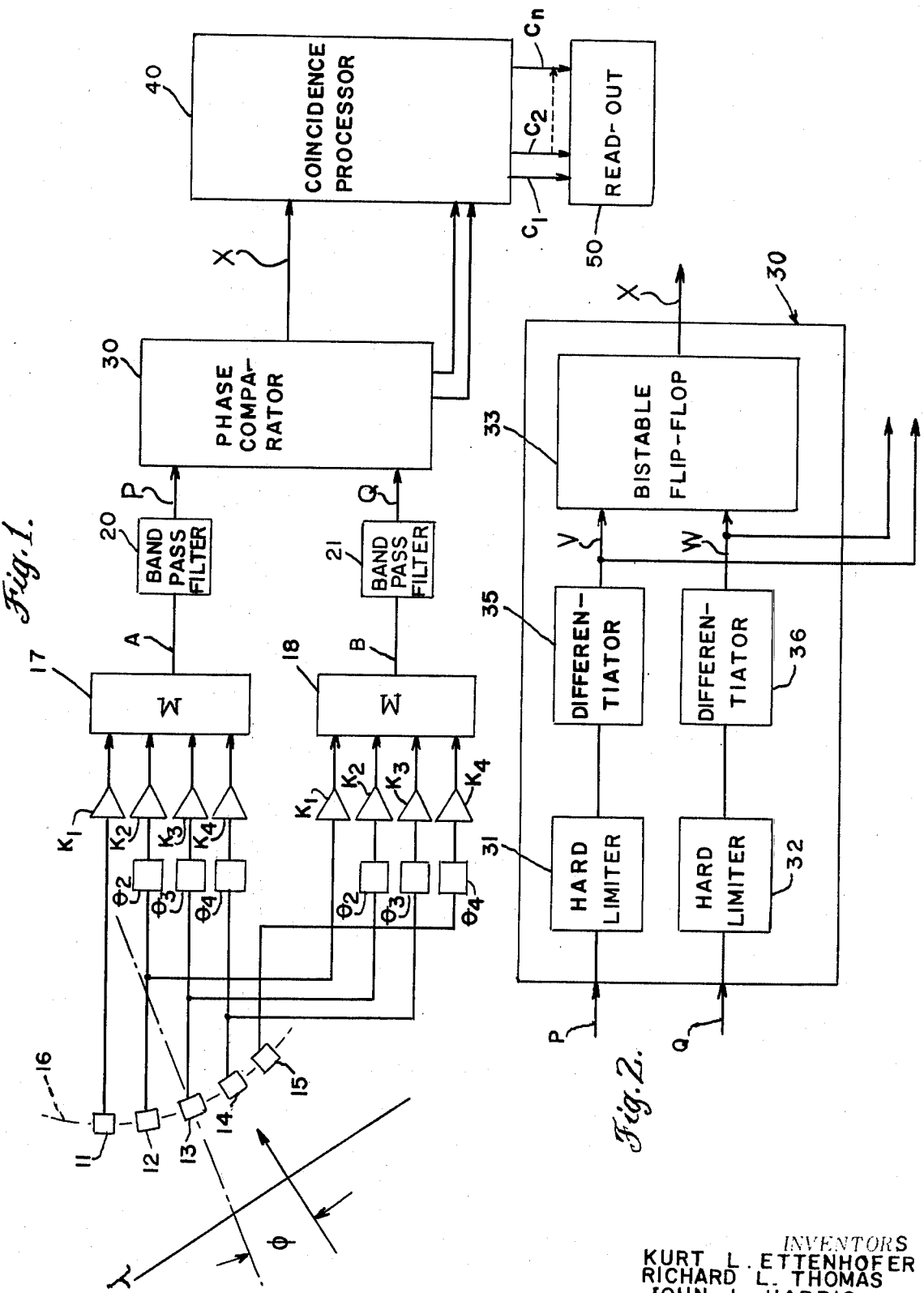

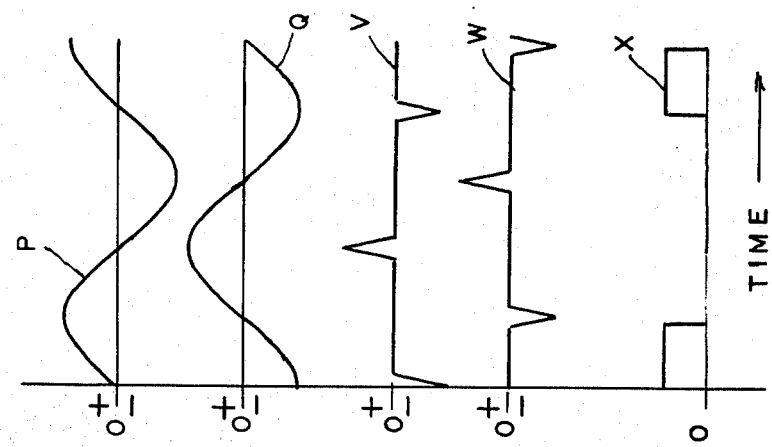
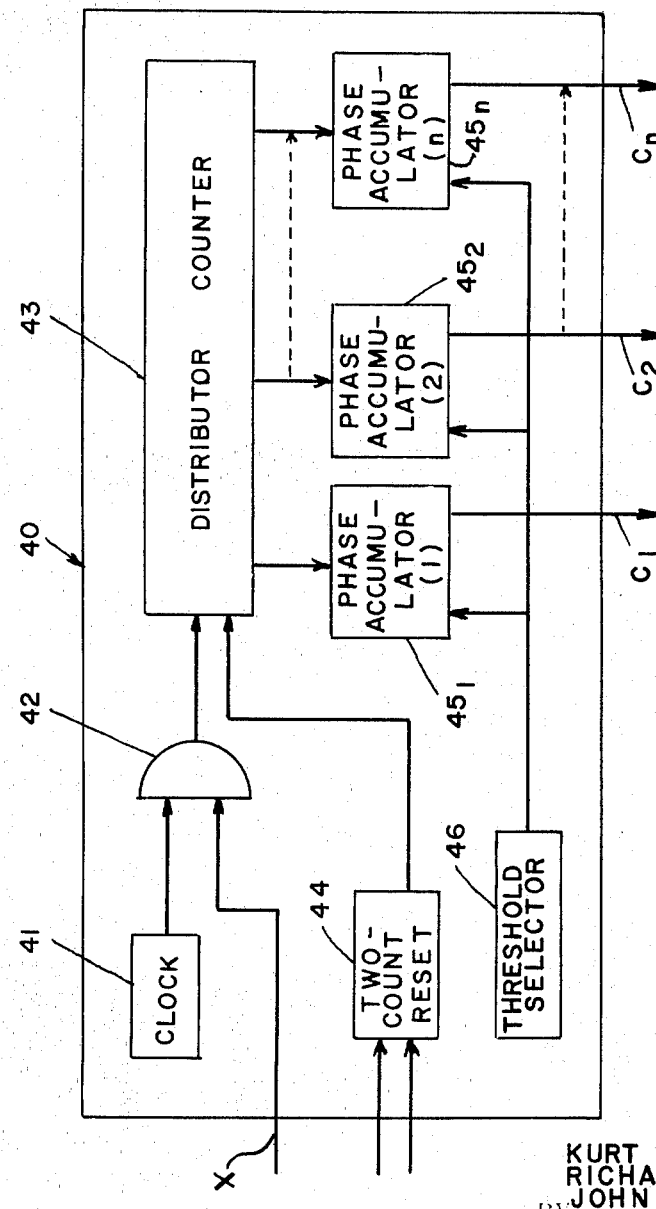

SENSOR ARRAY ACOUSTIC DETECTION SYSTEM

STATEMENT OF GOVERNMENT INTEREST

The invention described herein may be manufactured and used by or for the Government of the United States of America for governmental purposes without the payment of any royalties thereor or therefor.

BACKGROUND OF THE INVENTION

The present invention relates to acoustic detection apparatus and more particularly to apparatus for determining the direction of propagation of an acoustic signal emanating from a remote source.

Passive detection of distant man-made objects or acoustic sources, such as submarines, in a typically noisy medium is a well recognized problem in the art. Characteristically, man-made objects emanate acoustic signals which are generally coherent, periodic and localized as opposed to the aperiodic acoustic signals randomly appearing throughout a natural environment. Thus, in antisubmarine warfare in particular, it has been the general practice in the prior art to utilize the characteristic distinctions between the signal patterns of a man-made object, such as the patterns generated by a submarine propeller, and the random patterns distributed within the ocean. Such passive submarine detection systems operated on the principal distinctions between random and non-random processes, generally performed by correlation or integration of acoustic signals over predetermined intervals of time where the random signal characteristically exhibit substantially no correlation or substantially integrate to zero. The man-made signal, on the other hand, is generally correlated and integrates to a non-zero value. Accordingly, the various techniques devised in the past utilize this distinction to identify the presence of a man-made source, being combined with phase sensitive devices in order to determine the direction of the source relative the detection system. Since the presence of the man-made source in these systems is determined by inspecting acoustic signals coming from all directions the effective signal-to-noise ratio of the periodic man-made signal, which is typically localized, against the omnidirectional background noise is low and extensive processing is required in order to enhance the man-made signal. Thus, it has been the general practice in the prior art to statistically compare localized coherent signals against background noise received from all directions where typically the randomness of stationary background noise does not vary with azimuth.

SUMMARY OF THE INVENTION

Accordingly it is the general purpose and object of the present invention to provide a passive acoustic detection system which compares acoustic signals arriving along preselected increments of azimuth in order to detect a relatively localized non-random source against a random background. Other objects of the invention are to enhance electrically small phase differences of a periodic incoming acoustic signal and to process the incoming signals over small, discrete intervals of direction of propagation.

Briefly, these and other objects of the invention are accomplished by providing two overlapping arrays of hydrophones or sensors disposed in a cylindrical pattern, each hydrophone being connected to an electrical phase lag corresponding to a linear function of the propagation lag of the signal along the circumference of the cylinder, the arrays of the hydrophones being combined to form a left hand and a right hand sensing circuit. The output signals of the respective left hand and right hand sensor arrays are connected through preselected narrow band filters to a phase detector which determines the phase difference between the right hand and the left hand beam for a given detected frequency of an incoming acoustic signal. The output signal of the phase detector is connected to a coincidence processor which serially accumulates the transmitted phase signals for each cycle into discrete bins of phase angle. When the number of accumulated phase signals in any one particular bin exceeds a predetermined level, the processor generates an output signal indicative of the particular bin of phase angle.

BRIEF DESCRIPTION OF THE DRAWINGS

FIG. 1 is a schematic of an array acoustic detection system constructed according to the present invention;

FIG. 2 is a detailed schematic of a phase comparator of FIG. 1;

FIG. 3 is a detailed schematic of a coincidence processor of FIG. 1; and

FIG. 4 is a time sequence diagram of the phase comparator of FIG. 2.

DESCRIPTION OF THE PREFERRED EMBODIMENT

As shown in FIG. 1, an acoustic detection system comprises five omnidirectional sensors or hydrophones 11, 12, 13, 14 and 15 disposed on the circumference of an imaginary cylinder 16, the sensors in combination forming two overlapping arrays of four sensors each within this embodiment. Adjacent sensors 12, 13 and 14 are the common sensors for both arrays and sensors 11 and 15 on either end respectively, are singularly within the right hand and the left hand arrays only. Accordingly a two array sensor system of four sensors each is formed having three common sensors 12, 13 and 14, where sensor 11 completes the right hand array and sensor 15 completes the left hand array. The sensor arrays are disposed to intercept an acoustic signal wavefront $\lambda$ propagating at an azimuth angle $\phi$ with respect to a reference vector of the arrays. The chord of cylinder 16 between sensors 11 and 15 determines the shortest wavelength that can be effectively discriminated, however, it is contemplated that in most applications such as submarine detection, the speed of propagation of wavefront $\lambda$ and the frequency of the expected signals combine to produce wavelengths which are typically much larger than the distance between the extreme sensors. Within each array the respective sensor output signals are connected to corresponding conventional delays $\theta_2$, $\theta_3$ and $\theta_4$ which in this instance are the delays corresponding to the second, third and fourth sensor of each array, sensors 11 and 12 being respectively the first sensors of the corresponding arrays and therefore are not delayed. The delayed output signals of each sensor, together with the first sensor signals, are then amplified in respective amplifiers $K_1$, $K_2$, $K_3$ and $K_4$ in order to directionally shape the sensitivity of each sensor array, where the output of amplifiers $K_1$ through $K_4$ are combined in summers 17 and 18 to form a common output signal A for the right hand array and B for the left hand array. Signals A and B are then respectively connected to narrow bandpass filters 20 and 21 which pass a preselected frequency band of the signal. The outputs of filters 20 and 21 are connected to a phase comparator 30.

It is to be understood that the embodiment described herein refers to a five sensor configuration for the purposes of example only and other combinations of sensor arrays can be combined within the scope of the present invention. Furthermore the phase lags $\theta_2$, $\theta_3$, and $\theta_4$ are limited only by the restriction of a maximum of 360° electrical phase difference allowable as required to avoid ambiguity. Accordingly, for a wavelength of the acoustic signal $\lambda$ which is equal to the radius of cylinder 16 the actual maximum phase angle difference registered by sensors 11-15 will be equal to the angle enclosed by the extreme sensors where the maximum possible phase difference in electrical signals A and B can be as great as 360°. This particular relationship will be referred to herein below as the stiffness ratio of the sensor arrays providing a large electrical signal phase difference for small acoustic signal phase differences registered by the sensors.

As shown in more detail in FIG. 2, phase comparator 30 at the input side thereof comprises two hard limiters 31 and 32 respectively connected to receive the output signals from filters 20 and 21. The output signals from limiters 31 and 32 are differentiated by differentiators 35 and 36, which can be for example series connected capacitors, where the differentiator output signals are connected to the input of a bistable flip-flop 33. In this manner an acoustic signal of a preselected frequency, as determined by filters 20 and 21, is received by hard limiters 31 and 32 and converted to step functions corresponding to the polarity changes of the filtered signals. Differentiators 35 and 36 convert the step function signals to a series of spikes the polarity thereof being determined by the rise and return polarity of the step. Accordingly, the bistable flip-flop receives a train of alternating spikes from each differentiator 35 and 36 occurring at a frequency passed by filters 20 and 21. Upon receiving a spike of one polarity from one of the differentiators the bistable flip-flop 33 switches to a one state and remains in that state until another spike of the same polarity is received from the other differentiator at which time the flip-flop 33 switches to a zero state. In this manner a variable width pulse train is formed as the output signal of bistable flip-flop 33 at the frequency passed by filters 20 and 21 wherein, within each cycle, the percent of on time of the pulse corresponds to the electrical phase differences between signals A and B of the two sensor arrays.

The output of phase comparator 30 is connected to a coincidence processor 40. As shown in detail in FIG. 3 coincidence processor 40 comprises a clock 41 producing a continuous chain of pulses at a preselected frequency higher than the filtered frequency. An AND gate 42 is connected to receive the clock signal and the output signal of phase comparator 30, such that when a clock pulse and a phase pulse are both on AND gate 42 passes a one. In this manner a series of clock pulses are passed during the time that the output signal from phase comparator 30 is on. The output signal from AND gate 42 is connected to a distributor counter 43 which is also connected to receive an output signal from a two-count reset 44. Reset 44 can be any two bit counter known in the art connected to the output of phase comparator 30 responsive to pulses of one polarity only, such as the differentiator return pulses, thus when both signals A and B return to a positive state a reset signal is generated for resetting counter 43.

Accordingly counter 43 continues to accumulate the clock signals from AND gate 42 until reset 44 generates a signal. At this time the highest counter 43 count is passed to corresponding phase accumulators $45_1$ through $45_n$ which can be, for example, directly connected to the counter flip-flops, being gated by conventional means to receive the last flip-flop of the count. Thus each accumulator $45_1$ through $45_n$ will store the number of cycles a particular electrical phase angle is registered. Also connected to accumulators $45_1$-$45_n$ is a threshold selector 46 which enables a readout when the count in any one accumulator exceeds a predetermined count level and resets the accumulators. Accordingly accumulators $45_1$-$45_n$ respectively produce signals $C_1$-$C_n$ to any conventional readout unit 50 upon exceeding the threshold count which then display the specific accumulator that has exceeded a predetermined count level.

The operation of the present invention will now be described with reference to FIG. 4. As described hereinabove a man-made coherent single frequency acoustic signal $\lambda$ is traversing the sensor arrays at an azimuth $\phi$, being registered by the individual sensors at phase lags corresponding to the geometric displacement of each sensor along the propagation vector. Due to the curvature of each array a maximum of two sensors only can register the signal $\lambda$ at identical phase; the remaining sensors will either lead or lag depending on their location. At the same time various other wavefronts, typically random, are traversing the arrays from all directions forming the random background noise environment. Accordingly each sensor registers the combination of a coherent of manmade signal together with many incoherent random signals. The output signal of each sensor within an array is electrically delayed by a predetermined time lag in corresponding phase lags $\theta_2$, $\theta_3$ and $\theta_4$. Furthermore the electrically delayed sensor output signals of each array are fed to amplifiers $K_1$, $K_2$, $K_3$ and $K_4$ which amplify the signals according to any typical approximation of phase-amplitude characteristics of a directional sensor. In this manner the sum of the output signals of amplifiers $K_1$, $K_2$, $K_3$, and $K_4$ corresponding to each sensor array, as produced in summing units 17 and 18, combine to form signals A and B, each approximating a directional sensor. The directional sensors thus approximated form beam lobes at phase angles determined by the gain of amplifiers $K_1$ through $K_4$ and their corresponding phase lags $\theta_2$, $\theta_3$ and $\theta_4$. As described above the relationship between the electrical phase difference $\theta$ between signals A and B and the real phase angle or azimuth $\phi$ is defined as the stiffness ratio SR wherein $$\theta = SR(\phi) \tag{1}$$

or $$\theta_{LH} - \theta_{RH} = SR(\phi_{LH} - \phi_{RH}), \tag{2}$$

$\theta_{LH}$ and $\theta_{RH}$ being the electrical phase angles of signals A and B respectively relative the phase of sensors 11 and 12 and $\phi_{LH}$ and $\phi_{RH}$ being the real phase angles or azimuths relative the same sensors.

The respective signals A and B are filtered by narrow bandpass filters 20 and 21 selected to pass the frequency of the manmade signal. The output signals of filters 20 and 21 are shown as sinusoidal signals P and Q displaced in phase relative each other. The respective signals P and Q are then hard limited by limiters 31 and 32 and differentiated by differentiators 35 and 36 to form two alternating pulse trains V and W. Pulse trains V and W are then converted to a step function signal X in bistable flip-flop 33. Accordingly a pulse train of a frequency determined by the filters 20 and 21 is generated where the on time of the pulse corresponds to the displacement of the azimuth from a preselected mean value.

Signal X feeds to coincidence processor 40 where it is converted to a series of clock pulses by AND gate 42, the sequential clock signals triggering successive flip-flops of a conventional counter 43. At the end of each cycle of the acoustic signal $\lambda$, determined by the two-count reset 44, the last flip-flop of the counter 43 is registered in a corresponding accumulator $45_1$ through $45_n$. Accordingly each accumulator will store the number of cycles of signal $\lambda$ that are repeated traversing at an angle within a sector corresponding to that accumulator. Specifically, for example only, accumulator $45_2$ is selected to correspond to a sector of azimuth containing azimuth $\phi$ and is therefore in this case accumulating. Once any one accumulator reaches a count determined by threshold selector 46 it is recorded in readout 50, all other accumulators are reset and a new count is repeated.

Some of the many advantages of the present invention should now be readily apparent. The present invention provides an acoustic detection system which can be selectively limited to a relatively narrow angle of sensed acoustic signals while at the same time allowing maximum phase differences in the processing of the electrical signals. Furthermore the present invention utilizes the localized pattern characteristics of manmade acoustic signals to best advantage, effectively raising the signal-to-noise ratio of the signal by reducing the volume of background noise through both filtering and limiting the azimuth angle within each phase bin. In this manner the invention detects and discriminates manmade signals at a total signal-to-noise ratio heretofore considered too low for effective discrimination.

Obviously many modifications and variations of the present invention are possible in the light of the above teachings. It is therefore to be understood that within the scope of the appended claims the invention may be practiced otherwise than as specifically described.

What is claimed is:

1. An acoustic detection system for detecting the presence and the propagation path of a coherent acoustic signal emanating from a stationary source against random background signals comprising, in combination:

sensor means for detecting the acoustic and background signals and producing output signals indicative of the azimuths thereof relative to a reference plane;

filter means connected to receive said sensor means output signals for producing output signals indicative of a predetermined narrow-band frequency spectrum thereof;

phase detection means connected to receive pairs of said filter means output signals for producing an output signal in serial binary form whose pulse width is indicative of the azimuth of said acoustic signal;

sorting means connected to receive said phase detection means output signal for counting the number of pulses within widths corresponding to predetermined sectors of azimuth;

threshold means connected to said sorting means for enabling a sorting means output signal when said azimuths accumulated within any one sector exceed a predetermined number; and readout means connected to receive said sorting means output signal for displaying the sector exceeding said predetermined number.

2. An acoustic detection system according to claim 1, wherein:

said sensor means further comprising a plurality of acoustic sensors disposed in spatially curved arrays for producing output signals indicative of the acoustic signal registered at each sensor, preselected delay circuits each respectively connected to receive corresponding ones of said sensor output signals for producing output signals indicative of said sensor signals delayed by predetermined lags, amplifiers connected to receive respective ones of said delay circuit output signals for amplifying corresponding ones of said signals at predetermined gains, and summing means respectively connected to corresponding ones of said amplifiers for providing an output signal indicative of a sum of preselected ones of said amplifier output signals corresponding to any one array of said sensors.

3. An acoustic detection system according to claim 2, further comprising:

said phase detection means including hard limiters each respectively connected to receive corresponding ones of said summing means output signals, differentiators respectively connected to corresponding hard limiters and a bistable flip-flop connected to corresponding pairs of said differentiators responsive to signals of one polarity thereof for producing a pulse train output signal the pulse width thereof being indicative of the phase difference between corresponding ones of said summing means output signals.

4. An acoustic detection system according to claim 3, further comprising:

said sorting means including a digital clock for producing a timing signal, an AND gate connected to receive said timing signal and said phase detection means output signal for producing an output signal comprising a series of timing pulses the number thereof corresponding to the length of the pulse of said phase detection means output signal, counter means connected to receive said AND gate output signals for serially counting said timing pulses, reset means connected to said differentiators for producing a reset signal at the end of each cycle of the acoustic signal and accumulators connected to said counter means and said reset means for selectively accumulating respective ones of said counter means output signals upon receipt of said reset signal.

5. An acoustic detection system according to claim 4, further comprising:

said reset means including a counter connected to receive respective pairs of said differentiator output signals responsive to the other polarity thereof for counting said signals and producing a reset signal upon receiving signals from both differentiators.

* * * * *